AMPLIFIER DISTORTION CONTROL BY SWITCHING

Filed Jan. 21, 1965

INVENTOR
J. D. RINEHART
BY [signature]
ATTORNEY

United States Patent Office 3,399,358

Patented Aug. 27, 1968

3,399,358
AMPLIFIER DISTORTION CONTROL BY SWITCHING

James D. Rinehart, Bethesda, Md., assignor to Bell Telephone Laboratories, Incorporated, New York, N.Y., a corporation of New York Filed Jan. 21, 1965, Ser. No. 427,057
4 Claims. (Cl. 330—149)

ABSTRACT OF THE DISCLOSURE

The nonlinear distortion reducing system disclosed employs time division switching to reapply a distorted signal to the input of a distorting amplifier and then to combine a portion of the once-distorted signal and the redistorted signal in a sense to eliminate first order distortion.

Figures 1, 2:
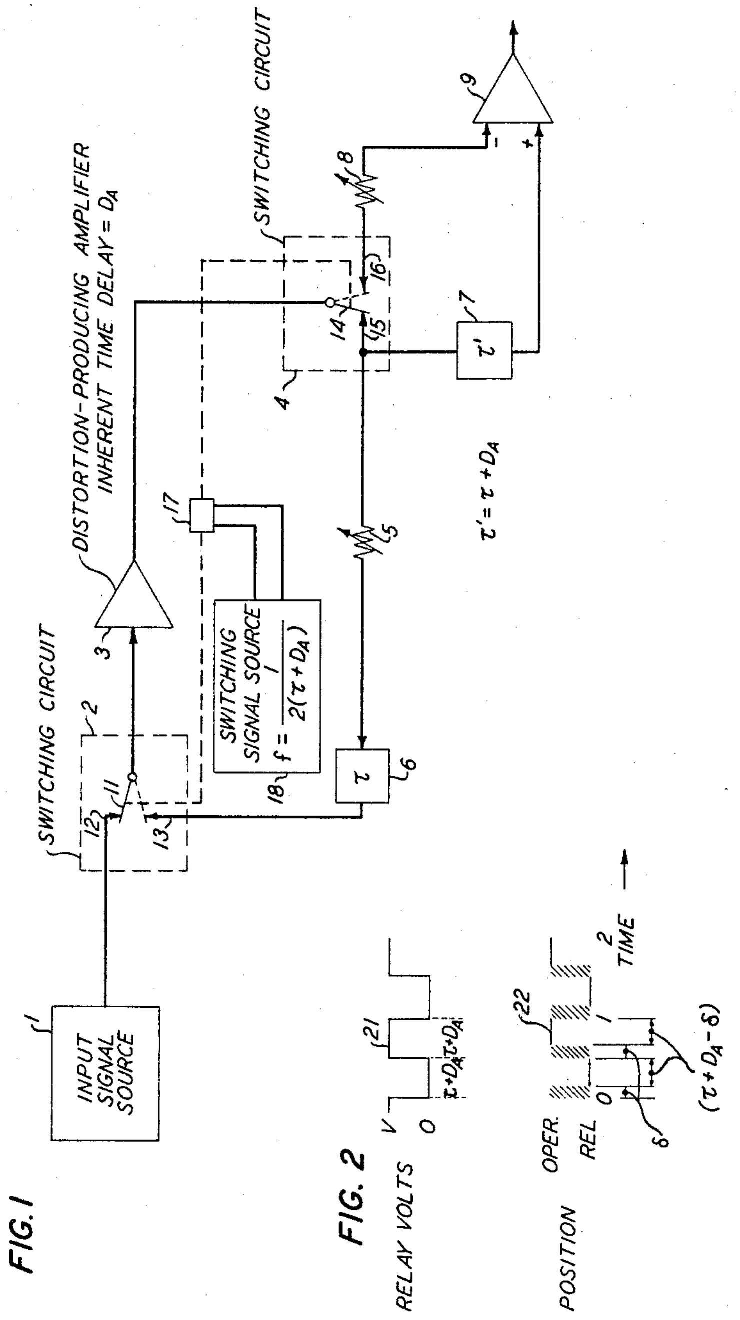

Various techniques are also disclosed for reducing the sampling distortion that may otherwise accompany this technique.

This invention relates to the reduction of distortion in amplifiers.

The elimination of distortion produced in amplifiers has heretofore required the employment of an equalizer with precisely determined amplitude-versus-frequency and phase-versus-frequency characteristics or has required the use of a duplicate of the distorting network to redistort the signal. An example of the use of a duplicate network may be found in Patent No. 2,776,410 to G. Guanella issued Jan. 1, 1957. Such additional equalizers and duplicate distorting networks are expensive and critical in adjustment.

It is an object of this invention to reduce amplifier distortion without the aid of such an equalizer or a duplicate network.

The invention resides in the recognition that elimination of first-order distortion can be accomplished without the use of a duplicate network if time division switching is employed to use the amplifier alternately for processing the original input signal and for deriving a correcting signal in the manner of prior art duplicate networks. To this end the output from the amplifier is reapplied to its input through a delay element introducing a delay $\tau$ by way of time division switches which operate in synchronism at a frequency equal to the reciprocal of twice the sum of $\tau$ and the amplifier delay $D_A$ alternately to apply to the input of the amplifier a sample of the undistorted input signal and a sample of the distorted feedback signal. Then, the output of the amplifier consists alternately of once-distorted signals and redistorted signals. The once-distorted signals are applied by further time division switching to a second network having a delay equal to the sum of $\tau$ and the amplifier delay and the redistorted signals are then applied to an attenuator network to reduce their level to one-half of the level of the once-distorted signals. The attenuated redistorted signals are then subtracted from the delayed once-distorted signals. Since the redistortion process tends to double the component of distortion that is called first-order distortion, the subtraction just described will tend to eliminate first-order distortion while yielding an output signal having a level equal to one-half of the level of the once-distorted signal from the amplifier.

Various features and advantages of the invention will become apparent from the following detailed description when considered in conjunction with the drawing, in which:

FIG. 1 is a partially schematic and partially block diagrammatic illustration of a preferred embodiment of the invention; and FIG. 2 shows curves that are helpful in understanding the theory and operation of the invention.

As shown in FIG. 1, a source 1 of input signals is connected through a switching circuit 2 via a contact 12 and a switch arm 11 to an amplifier 3, which incidentally during the course of its operation produces some amplitude, or nonlinear, distortion. That is, the output signal of amplifier 3 is not exactly proportional to its input signal in every respect. It is understood, however, that amplifier 3 may include feedback circuits that help to reduce the distortion that would otherwise exist. It is frequently not desirable to rely solely upon such feedback circuits.

The output signal of amplifier 3, here referred to as "once-distorted" since it carries the distortion resulting from a single passage through the amplifier, is applied through a switching network 4 via a switch arm 14 and a contact 15 to a feedback network comprising an attenuator 5 and a delay network 6. Attenuator 5 is adjusted to have a gain that is the reciprocal of the nominal gain of amplifier 3 times the reciprocal of the gain of delay network 6, and delay network 6 provides a time delay of $\tau$ seconds. Simultaneously, the once-distorted signal of amplifier 3 is also applied to a time delay network 7, which may, like delay network 5, comprise a delay line, via the switch arm 14 and the contact 15 and $\tau'$ seconds later passes from the output of network 7 to an input of a summing network 9, which may be a differential amplifier such as that disclosed in Patent No. 2,780,682 issued to G. Klein Feb. 5, 1957. $\tau'$, the time delay of network 7 is equal to the sum of $\tau$, the time delay of network 6, and $D_A$, the inherent delay of amplifier 3.

The output of delay network 6 is connected through switching circuit 2 via the contact 13 and the switch arm 11 to the input of amplifier 3 during the period when signal source 1 is disconnected from the input of amplifier 3.

Signals passing from the delay network 6 through the amplifier 3 are again subjected to distortion by amplifier 3; and the redistorted signals are applied through the switch arm 14 and the contact 16 of the switching network 4 and thence through an attenuator 8 to a second input of the summing network 9 in a polarity to subtract from the once-distorted signals applied to the first input of network 9 from delay network 7. It will be noted that the respective total delays of the two circuits paths from contact 15 of switching network 4 to the two inputs of summing network 9 are equal. Attenuator 8 is adjusted to have an impedance slightly greater than the impedance of the input of summing network 9 to which it is connected in order to provide a gain of one-half multiplied by the gain of delay network 7. If delay network 7 were attenuation-free, attenuator 8 would have an impedance exactly equal to the impedance of the input of summing network 9 to which it is connected.

The switching networks 2 and 4 are synchronized so that the switch arm 11 is closed to the contact 12 for a time interval of $D_A$ seconds before the switch arm 14 is closed to the contact 15. Similarly, the switch arm 11 is closed to the contact 13 for a time interval of $D_A$ seconds before the switch arm 14 is closed to contact 16. The contacts 11–16 may be included in a common delay 17, since methods of sequencing relay contacts in the foregoing manner are well-known in the art; or switching circuits 2 and 4 may comprise separate relays operated in sequence to satisfy the above-described conditions. The winding of the relay 17 is connected across a source 18 of a switching signal having a frequency, $$f=\frac{1}{2(\tau+D_A)}$$

The signals from source 18 are shown in curve 21 of FIG. 2. Obviously electronic switches or gating circuits could be employed in place of the relay circuitry, which is shown herein for convenience in illustrating the invention.

The operation of the invention is based upon the following characteristics of nonlinear, or amplitude, distortion of a typical amplifier. The component of the output signal of amplifier 3 that represents distortion is very small in magnitude in comparison to the component of the output signal that is linearly related to the input signal. If this output signal is redistorted by the same network, the component of the redistorted signal that represents distortion of the aforesaid linear component is small compared to the component that is still linearly related to the input signal; and the component of the redistorted signal that represents second-order distortion, i.e., distortion of the previously produced distortion, is very small in comparison to the newly produced distortion of the aforesaid linear component.

Under these conditions, the original distortion and the newly produced distortion of the linear signal components are additive in the redistorted signal so that together they (together the total first-order distortion) are a larger proportion of the redistorted signal than the original distortion was of the once-distorted signal. If the redistorted signal is attenuated until the first-order distortion of the redistorted signal is just equal to the distortion in the once-distorted signal, then the linear signal component of the redistorted signal is smaller than the linear signal component of the once-distorted signal and cancellation of the distortions by an appropriate summing network will leave a residual linear signal component. The attenuation can be arranged, for example, as shown in FIG. 1, so that a net overall gain greater than unity is obtained from the combination of amplifier and distortion-reducing network.

In the operation of the embodiment of FIG. 1, input signals from source 1 are sampled by switching circuit 2 at the frequency, $f$, which is the frequency at which source 18 drives relay 17 to operate and release repetitively. The signal sample passes through contact 12 and switch arm 11 to the input of amplifier 3. It may be noted that a finite time, $\delta$, is required for switch arm 11 to move in either direction between contacts 12 and 13. Consequently, the initial signal sample will be longer if operation starts with relay 17 in the released position than it would be if operation starts with relay 17 in the operated position. The latter situation is more representative of the steady state operation of the circuit and is therefore illustrated at time=0 in curve 22 of FIG. 2, although in FIG. 1 the contacts of relay 17 are shown in the released position that they assume shortly after time=0.

The curve 22 of FIG. 2 is positioned with respect to curve 21 so that the solid line representing the "released" state corresponds to the closing of switch arm 11 to contact 12 and the solid line representing the "operated" state corresponds to the closing of switch arm 11 to contact 13. The entire curve 22 may be shifted to the right with respect to cruve 21 by a time interval equal to $D_A$, the delay of amplifier 3, to represent the closing of switch arm 14 in switching circuit 4 to contacts 15 or 16 for the released or operated conditions respectively.

Curve 22 shows that the input signal sample applied to amplifier 3 has a duration equal to $\tau+D_A-\delta$.

This sample is amplified in amplifier 3 by a factor A, where A is based upon the linear portion of the output signal, and is delayed for a time $D_A$. Nonlinear distortion is also produced. As the first part of the sample emerges from amplifier 3, switch arm 14 has just moved to contact 15. Time delay network 7 delays the once-distorted sample for a time $\tau'=\tau+D_A$. Simultaneously, in the feedback path, attenuator 5 attenuates the once-distorted signal by a gain factor of $1/A$. The attenuated signal from attenuator 5 is delayed for a time $\tau$ by delay network 6. As the sample emerges from network 6, switch arm 11 has just closed to contact 13 in response to the application of a voltage V to relay 17 $\delta$ seconds earlier, as shown by curves 22 and 21 of FIG. 2. The sample is recirculated through amplifier 3 and is again amplified by the factor A, redistorted, and again delayed for a time $D_A$.

The total amplitude distortion of the sample emerging from amplifier 3 is now approximately twice that of the once-distorted sample currently passing through network 7; and the magnitudes of the linear components of these signals are approximately equal. As the redistorted sample emerges from amplifier 3, switch arm 14 has just closed to contact 16. The redistorted sample is attenuated by attenuator 8 by a gain factor of approximately one-half so that its first-order amplitude distortion is approximately equal to the amplitude distortion of the once-distorted sample now emerging from delay network 7; but its linear component is now one-half as large as the linear component of the signal emerging from network 7.

Summing network 9 substracts the redistorted sample passed by attenuator 8 from the once-distorted signal passed by delay network 7, thereby substantially eliminating the first-order distortion and yielding an output signal that is an accurate replica of the input signal sample multiplied by a factor $A/2$.

The foregoing process of recirculating a distorted signal sample is repeated periodically at the frequency of source 18. Distortion of each sample may be substantially eliminated.

As is well-known in the art, sampling distortion may be made arbitrarily small by selecting the frequency $f$ of source 18 to be sufficiently greater than the frequencies of the signals present in source 1. The well-known Nyquist criterion is that the sampling frequency should be twice the highest frequency of the signals from source 1. It is, of course, apparent that if the signal from source 1 is already intermittent in a periodic fashion, source 18 can be synchronized with the intermittent signals from source 1.

In applications in which the frequency of source 18 cannot be made a high as desired, a push-pull amplifying arrangement based on the invention will reduce sampling distortion. For example, a duplicate of the portion of FIG. 1 extending between source 1 and summing circuit 9 may be connected between source 1 and summing circuit 9 to provide two signal channels therebetween. The duplicate channel is provided with switching sequences analogous to those of the other channel but complementary thereto so that the only portions of the input signal not reaching the output lie in the two intervals $\delta$ during which the switch arms in switching circuit 2 and in its complement in the other channel are moving between contacts.

Various modifications of the invention could be made. As noted heretofore, the relay 17 and contacts 11–16 could be replaced by an electronic switch. This change should make it possible to reduce the switching time $\delta$. By using a switching frequency equal to the reciprocal of twice $D_A$, it is possible to reduce the time delay $\tau$ to zero.

An invention that is related to the present invention is disclosed and claimed in the copending application of Z. Szekely, Ser. No. 420,047, filed Dec. 21, 1964, and assigned to the assignee hereof.

What is claimed is:

1. A system for reducing distortion in signals transmitted through a distortion producing network having an input and an output and an inherent time delay $D_A$, comprising a feedback circuit including a first attenuator and a first time-delay device having a time delay, a first switching circuit providing a first path through which said signals are first applied to said input of said distorting network during a first time interval and a second path connecting said feedback circuit to said input of said distorting network during a second time interval following said first time interval, a second switching network providing a third path from said distortion producing network during a third time interval substantially equal in duration to said first time interval and commencing $D_A$ seconds after said first time interval has commenced, said feedback circuit and said third path having a common connection in said second switching network, said second switching network providing a fourth path from said distortion producing network during a fourth time interval substantially equal in duration to said second time interval and commencing $D_A$ seconds after said second time interval, a summing circuit having first and second inputs and an output, a second time delay device connecting said third path to said first input of said summing circuit, said second time delay device having a delay equal to the sum of said relays of said first delay device and said distortion producing network, and a second attenuator connecting said fourth path to said second input of said summing circuit in a polarity to reduce distortion of said signals at said summing circuit output.

2. A system for reducing distortion in signals transmitted through a distortion producing network having an input and an output and an inherent time delay, $D_A$, a feedback circuit including a first attenuator and a first time-delay device having a time delay $\tau$, a switching circuit providing a first path through which said signals are first applied to said input of said distorting network during a first time interval, $D_A+\tau-\delta$, where $\delta$ is the time interval required for said first path to change between open and closed states, said switching circuit providing a second path from said output of said distortion producing network to said feedback circuit for a second time interval substantially equal in duration to said first time interval and commencing $D_A$ seconds later, said switching circuit providing a third path from said feedback circuit to said input of said distortion producing network during a third time interval substantially equal in duration to said first time interval and commencing $\delta$ seconds after said first time interval ends, said switching circuit providing a fourth path from said output of said distortion producing network during a fourth time interval substantially equal in duration to said first time interval and commercing $\delta$ seconds after said second time interval ends, and means for driving said switching circuit repetitively at a frequency equal to the reciprocal of twice the sum of $\tau$ and $D_A$.

3. A system according to claim 2 in which the driving frequency is substantially higher than any information frequency in the signals transmitted through the distortion producing network.

4. A system for reducing distortion in signals transmitted through a distortion producing network having an input and an output and an inherent time delay $D_A$, a feedback circuit including a first attenuator and a first time-delay device having a time delay $\tau$, a switching circuit providing a first path through which said signals are first applied to said input of said distorting network during a first time interval, $D_A+\tau-\delta$, where $\delta$ is the time interval required for said first path to change between open and closed states, said switching circuit providing a second path from said output of said distortion producing network to said feedback circuit for a second time interval substantially equal in duration to said first time interval and commencing $D_A$ seconds later, said switching circuit providing a third path from said feedback circuit to said input of said distortion producing network during a third time interval substantially equal in duration to said first time interval and commencing $\delta$ seconds after said first time interval ends, said switching circuit providing a fourth path from said output of said distortion producing network during a fourth time interval substantially equal in duration to said first time interval and commencing $\delta$ seconds after said second time interval ends, and means for driving said switching circuit repetitively at a frequency at least twice any information frequency in the signals transmitted through the distortion producing network.

References Cited

UNITED STATES PATENTS

| | | | |
|---|---|---|---|
| 2,970,276 | 1/1961 | Dollinger | 330—149 X |
| 3,131,349 | 8/1964 | Cary et al. | 330—9 X |

ROY LAKE, *Primary Examiner.*

NATHAN KAUFMAN, *Assistant Examiner.*